July 1, 1969     F. G. CALLAHAN     3,453,351
PROCESS OF MAKING PADDING MATERIAL
Filed June 22, 1966
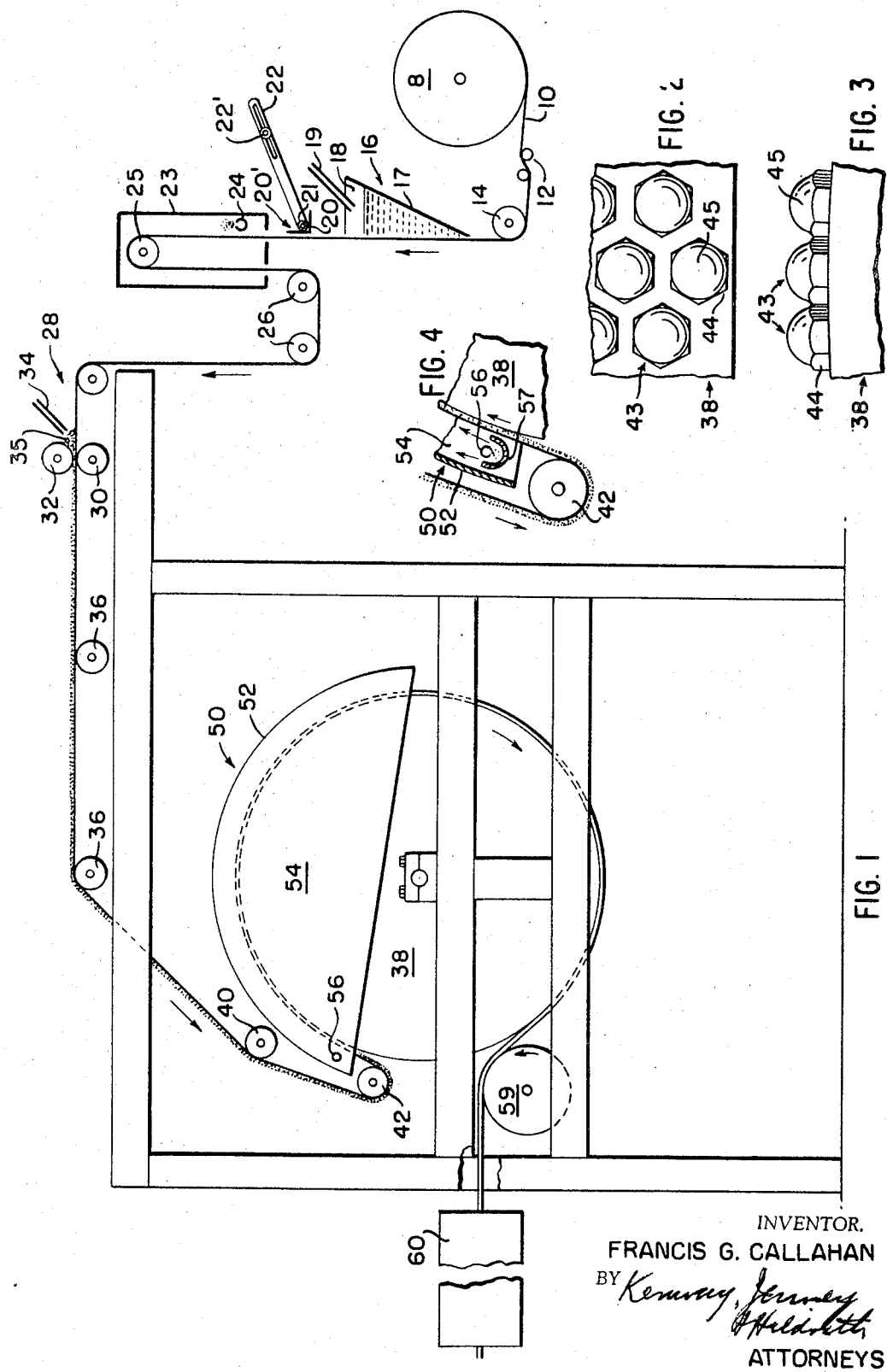
INVENTOR.
FRANCIS G. CALLAHAN
BY Kenway, Jenney
& Hildreth
ATTORNEYS 3,453,351
PROCESS OF MAKING PADDING MATERIAL
Francis G. Callahan, Dalton, Ga., assignor to Textile Rubber & Chemical Co. Inc., Dalton, Ga., a corporation of Georgia
Filed June 22, 1966, Ser. No. 559,430
Int. Cl. B29c 13/00; B32b 25/10
U.S. Cl. 264—47     2 Claims

ABSTRACT OF THE DISCLOSURE

A padding material, such as a carpet underlay, is made by applying a latex foam layer to a fabric backing, and molding the foam on a cylinder to form a pattern while gelling the foam by direct contact with steam. The fabric may be provided with a precoat which is gelled by contact with steam prior to the application of the foam layer.

---

The present invention relates to a process of making padding material, more particularly a padding material in the form of a carpet underlay having a fabric backing and a molded surface of foamed latex.

The object of the present invention is to provide a simple and economical process of manufacturing a fabric-backed molded latex material, such as may be used for a carpet underlay.

In the accompanying drawings, FIG. 1 is a diagrammatic drawing of apparatus for practicing the process of the present invention;

FIGS. 2 and 3 are detail views of the molding drum; and

FIG. 4 is a detail view of the steam gelling apparatus.

According to the present invention there is provided a feed roll 8 of backing material 10, which is preferably a loose woven or open mesh burlap having about eight warp threads and eight filler threads per inch. The fabric 10 is fed from the feed roll 8 over a tension bar 12 and under a guide roll 14 to pass vertically to wipe over the face of a coater 16 where a latex precoat is applied. As shown in FIG. 1, the coater comprised a trough having an inclined side wall 17 and end walls 18. The left-hand side of the trough is formed by the portion of the fabric to be coated which is in contact with the trough. As the fabric passes across the latex in the trough a thin coating is deposited on it. The top of the trough is open to permit it to be kept filled with compound, as indicated by the filler pipe 19.

An adjustable scraper 20' is provided to make the coating of uniform thickness. The scraper comprises an angle iron 20 which extends across the fabric and forms a sharp edge in contact with the latex precoat. The angle iron is pivotally mounted at 21 on bars 22 which are longitudinally adjustable by bolt and slot connections 22'. By angular adjustment of the angle iron at the pivot 21 the edge or corner of the angle iron may be presented to the precoat in an angular relationship for satisfactory scraping of excess coating from the fabric. The thickness of the precoat is determined by the longitudinal adjustment of the bars. The excess material that is scraped off the fabric drops back into the trough. If it were attempted to apply a thin coating of accurate thickness at the trough 16, non-uniformities might result and some portions of the fabric might not be coated at all. By the arrangement described herein, it is possible to apply a relatively thick precoat without regard for non-uniformities and then reduce it to a uniform thin coat by the scraper.

Although the compound applied at this point may be of substantially any rubberlike composition, it is preferred to use a synthetic rubber latex with a very high percentage of filler, as for example, about 200 parts of clay per 100 parts of latex. This compound is of high viscosity and the thin coat thereof (preferably about .010 to .030 inch thick) effectively seals the mesh of the fabric. The compound may be frothed by beating in air in the known manner of forming foamed latex. Frothing is not essential but it is preferred since it facilitates uniform application of the compound to a fabric and diminishes the amount of material in a coat of a given thickness. The precoat is porous but is sufficiently firm after gelling to anchor the fabric in a dimensionally stable condition.

The latex may be colored with a dye to give approximately the same color as the fabric backing so that no unsightly contrast of color occurs between the fabric and the latex, or it may be colored the same color as the subsequently applied latex material.

The sheet then passes through a steam box 23 in which an atmosphere of saturated steam is maintained by means of steam admitted through a perforated pipe 24. The latex is there gelled or coagulated, but the temperature is not high enough to cause curing. The steam readily penetrates the precoat and contacts the latex on both sides, so that the gelling operation proceeds rapidly.

The fabric sheet passes over a roll 25 in the steam box. The sheet emerging from the box passes under guide rolls 26 to the foam-applying section 28 of the machine. In passing under and around the rolls 26 the tension on the fabric causes the gelled material to be compressed, so that if the latex applied at the coater 16 was foamed, the compression at the rolls 26 squeezes the air out of the cells and reduces the foam to a substantially non-cellular film.

In the passage from the steam box 23 to the foam-applying section 28, the precoated sheet is exposed to the atmosphere over a sufficiently long distance to allow the precoat to cool to room temperature in order that the foam subsequently applied will not be subject to gelling action on contact therewith.

The foam applying section 28 may be of conventional form comprising a back roll 30 and a doctor roll 32 spaced apart sufficiently to provide a desired thickness of foam thereon. Alternatively a conventional knife coater may be used. Foamed latex, prepared in the usual manner by beating air into a latex, is supplied in a creamy consistency by the conventional form of reciprocating pipe 34 which deposits the foam in a puddle 35 on the precoated fabric sheet in back of the doctor roll 32. In order that the final product shall have marked cushioning properties, the foamed latex thus deposited is of the consistency of heavy cream, as is well known in this art. The thickness of the foam layer may be as desired; a layer of approximately three-tenths of an inch in thickness has been found to produce a satisfactory carpet underlay.

The sheet with the foam thereon passes over guide rolls 36 and thence toward a molding cylinder or drum 38 where the foam is molded with the desired pattern and is gelled. To this end the coated fabric sheet passes over a guide roll 40 spaced outwardly from the periphery of the drum 38 and thence turns sharply around a guide roll 42 which is spaced from the periphery of the drum 38 by the distance somewhat greater than the desired thickness of the molded layer. As shown in FIG. 1 the fabric turns through nearly 180° in passing over roll 42 and the liquid foam layer on the surface of the precoated fabric is brought immediately into contact with the drum 38.

The precoat and the foam layer are formulated with usual gelling agents, plasticizers, accelerators and stabilizers in accordance with known procedures in this art.

As shown in FIGS. 2 and 3, the drum is provided with a number of rows of projections 43 each having a hexagonal base 44 and a spherical outer contour 45, the hexagonal bases being arranged in a honeycomb pattern. The foam is continuously brought into contact with the drum 38 from the guide roll 42, and since it is free-flowing and in ungelled condition, it flows around the projections 43 and fills the mold in the honeycomb pattern characterized by ribs separated by spherical projections. These ribs are formed by the spaces between the hexagonal bases 44 of FIG. 3, and the depressions are the inverse of the spherical projections 45.

During a large part of the time of contact of the foam layer with the drum for the molding operation the fabric with the coatings thereon passes through a steam chamber or hood 50. This chamber comprises a curved sheet metal piece 52 spaced sufficiently away from the drum to contain an atmosphere of saturated steam above the fabric sheet, and it has shrouds 54 of segmental shape disposed close to the ends of the drum 38 to confine the steam atmosphere. In this chamber 50 the foam layer is subjected to heat for a sufficient period to cause gelation thereof without curing either the foam latex or the precoat. To this end a perforated steam pipe 56 extends across the drum inside the hood near the exit thereof. The steam is at about 212° F. in the pipe and at low pressure. As the steam contacts the outer fabric layer at atmospheric pressure it rapidly heats the foam to gelling temperature.

As shown in FIG. 4 the orifices in the steam pipe 56 are arranged to direct the steam in low velocity jets into a trough 57 which causes the steam to pass in a direction generally tangential to the periphery of the drum so that the steam is not projected directly against the material. Rather the steam forms a steam atmosphere about the coated fabric which is in contact with the upper portion of the drum. The gelation, while on the drum, of the foam layer adjacent to the precoat causes bonding of the two layers together. The gelation extends through the entire foam layer and coagulates the foam so that it has sufficient strength to permit stripping from the drum 38.

An important advantage of the use of steam for gelation is that it permits easy stripping of the molded layer from the drum. The presence of the steam prevents excessive drying of the latex during its contact with the drum. Consequently the latex retains moisture during gelation, and this moisture in conjunction with the soaps in the latex forms a lubricant between the latex and the drum, so that the molded material will strip from the drum without sticking or tearing. Moreover the steam atmosphere is self-limited in temperature, whereas dry heat would require close temperature control to prevent the accelerators from beginning to work, which would cause premature curing and sticking of the material to the drum.

The molded material is stripped from the drum 38 as it passes over a guide roll 59. The material is then passed into a curing oven of conventional design, shown diagrammatically at 60, wherein the coated material is heated to a sufficient temperature and for a sufficient time to cause complete curing of both the precoat and the cushion layer in accordance with known practice.

The material may then be wound up on any suitable form of take-up roll in accordance with usual practice.

Having thus described the invention, I claim:

1. A process of making a laminate of fabric and molded foam latex comprising; applying a frothed latex precoat with a high filler content to an open mesh fabric; compressing said precoat after gelling to form a substantially non-cellular film; gelling the latex precoat without curing it, applying a layer of latex foam to the precoat, moving the fabric to bring said latex foam layer into contact with a mold having projections formed to produce a pattern of ribs separated by depressions in said layer; contacting steam with the fabric while said layer is in contact with the mold to gel the latex foam without curing it, stripping the molded and gelled foam latex from the mold, and heating the coated fabric to cure the precoat and the molded foam layer.

2. A process as defined in claim 1 in which the gelling of the precoat is effected by contact with steam.

References Cited

UNITED STATES PATENTS

| | | | |
|---|---|---|---|
| 2,727,278 | 12/1955 | Thompson | 264—45 |
| 3,138,431 | 6/1964 | Swiggett | 117—163 |
| 3,210,447 | 10/1965 | Cyr et al. | 264—47 |
| 3,219,502 | 11/1965 | Willy | 264—47 |
| 3,296,009 | 1/1967 | Schütte | 117—163 |

FOREIGN PATENTS 764,330  12/1956  Great Britain.

JULIUS FROME, *Primary Examiner.*

U.S. Cl. X.R.

117—163; 264—45